Dec. 4, 1962   E. T. OAKES ET AL   3,066,707
DISPENSING DEVICE FOR FLUIDS AND SEMI-FLUIDS
Filed Sept. 23, 1958   2 Sheets-Sheet 1

INVENTORS
EARLE THOMAS OAKES
LOUIS GARTH DOOM
PAUL ALBERT McELLIGOTT
PAUL E. SUNDHEIM
BY
Brumbaugh, Free, Graves & Donohue
THEIR ATTORNEYS Dec. 4, 1962    E. T. OAKES ET AL    3,066,707
DISPENSING DEVICE FOR FLUIDS AND SEMI-FLUIDS
Filed Sept. 23, 1958    2 Sheets-Sheet 2

INVENTORS
EARLE THOMAS OAKES
LOUIS GARTH DOOM
PAUL ALBERT McELLIGOTT
PAUL E. SUNDHEIM
BY
Brumbaugh, Free, Graves & Donohue
THEIR ATTORNEYS 3,066,707
DISPENSING DEVICE FOR FLUIDS AND
SEMI-FLUIDS
Earle Thomas Oakes, Islip, Lewis Garth Doom, East Islip, Paul Albert McElligott, Greenlawn, and Paul E. Sundheim, Bayport, N.Y., assignors to The E. T. Oakes Corporation, Islip, N.Y., a corporation of New York
Filed Sept. 23, 1958, Ser. No. 762,749
8 Claims. (Cl. 141—129)

This invention relates to improvements in pastry and confectionery making machinery, and it relates particularly to an improved form of depositor for depositing batters, icings, fillings and other liquid and semi-plastic materials used in the confectionery and baking industries.

In accordance with the present invention, the depositor includes a plurality of nozzles provided with valves whereby a continuous flow of material from a source of material under pressure, such as a continuous mixer or a pressurized feed container or positive displacement pump, can be diverted from one nozzle to the other for depositing the material alternately through nozzles without interrupting the flow of the material from the mixer or supply source.

More particularly, a depositor in accordance with the present invention includes a manifold to which a stream of liquid or semi-plastic material is supplied under pressure, the manifold being provided with two or more nozzles, each having a valve therein, the valves being interconnected so that one of them is opened as the other is closed to alternately discharge the pressured material through the nozzles, so that the flow of the material to be deposited into and through the manifold is not interrupted by the opening and closing of the valves.

The valves and nozzles are constructed to eliminate dripping or leaking of the material when the valve is closed, and moreover are constructed to enable the flow of the material through the nozzles to aid in closing and seating the valves and thereby quickly terminate the discharge of the material therefrom.

Moreover, the nozzles of the depositors may have depositing openings of varying shapes and sizes, and the entire apparatus including the depositing nozzles can be readily dismantled for cleaning and servicing, thereby satisfying requirements of sanitary codes.

For a better understanding of the present invention, reference may be had to the accompanying drawings in which.

Figure 1:
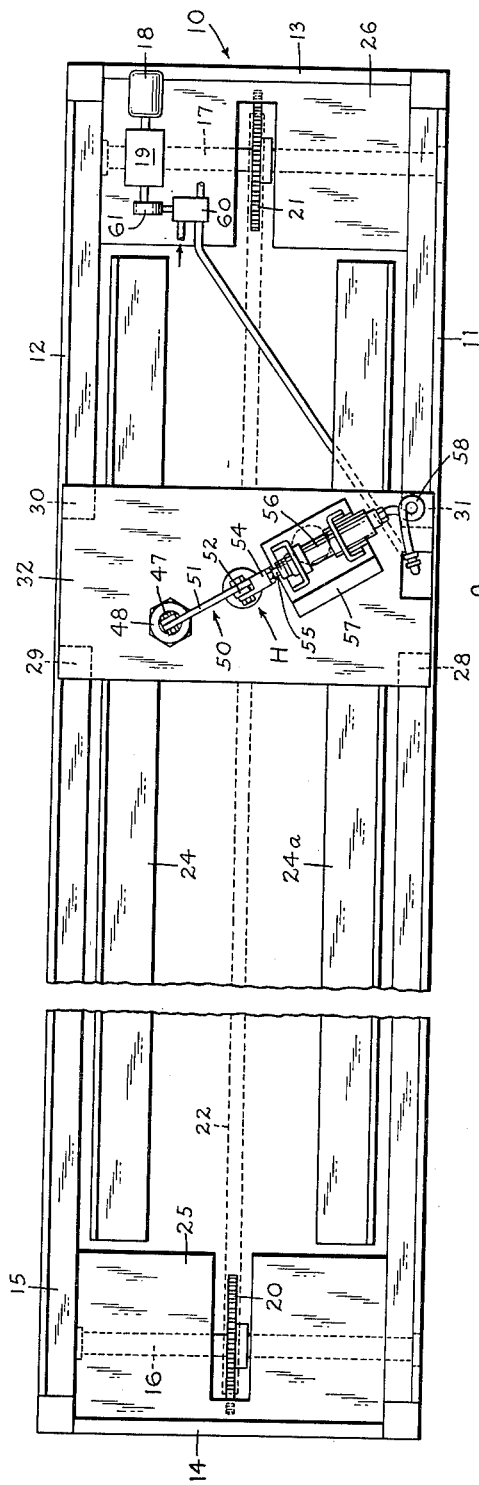
FIG. 1 is a plan view of a typical depositing apparatus embodying the present invention.
Figure 2:
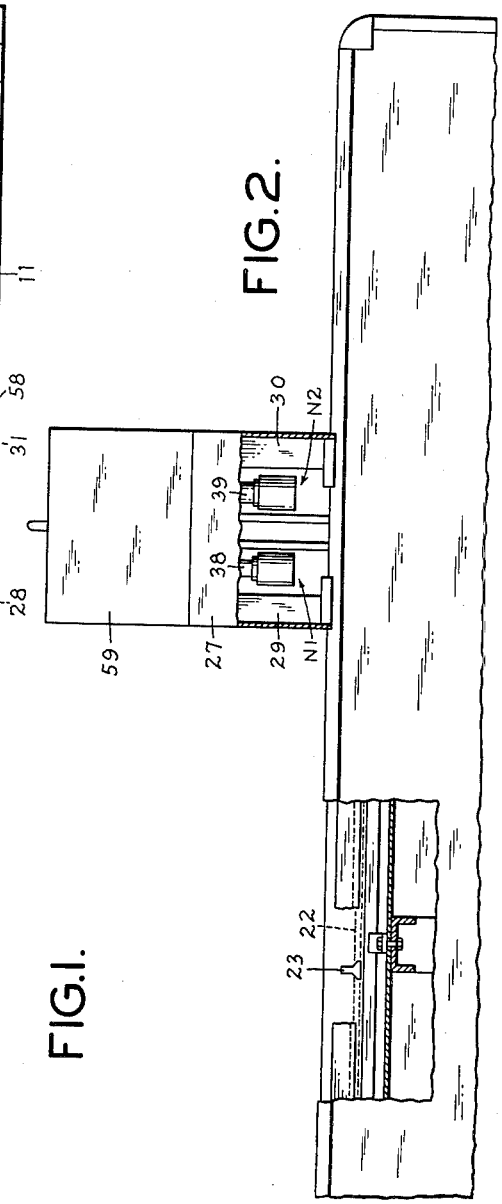
FIG. 2 is a side elevational view of a portion of the depositing apparatus with parts thereof broken away to disclose details.

The depositor embodying the present invention may be utilized in various types of equipment and may be constructed as separate depositing apparatus or may be used in a bakery line in which products are moved successively past the depositing head for receiving a topping, filling or the like. In the form of the invention illustrated, a cabinet or casing 10 is provided which may be fixed in position or mounted on rollers (not shown) for portability. The cabinet 10 has side and end panels 11, 12, 13 and 14 which are supported on a suitable framework 15 which carries at its opposite end a pair of shafts 16, 17. The shaft 17 is driven by means of a motor 18 and reduction or variable speed gear 19 so that the shaft can be rotated at a predetermined speed. The shafts 16 and 17 are provided with sprockets 20 and 21, respectively, over which is passed an endless chain 22 provided with upwardly extending pusher members 23 by means of which trays of confections or bakery products may be moved from one end of the cabinet to the other while supported on the slide plates or tracks 24 and 24a extending lengthwise of the cabinet 10 and frame 15. At opposite ends of the cabinet are platforms 25 and 26 on which the trays are placed and discharged as they are moved through the depositor.

Figure 3:
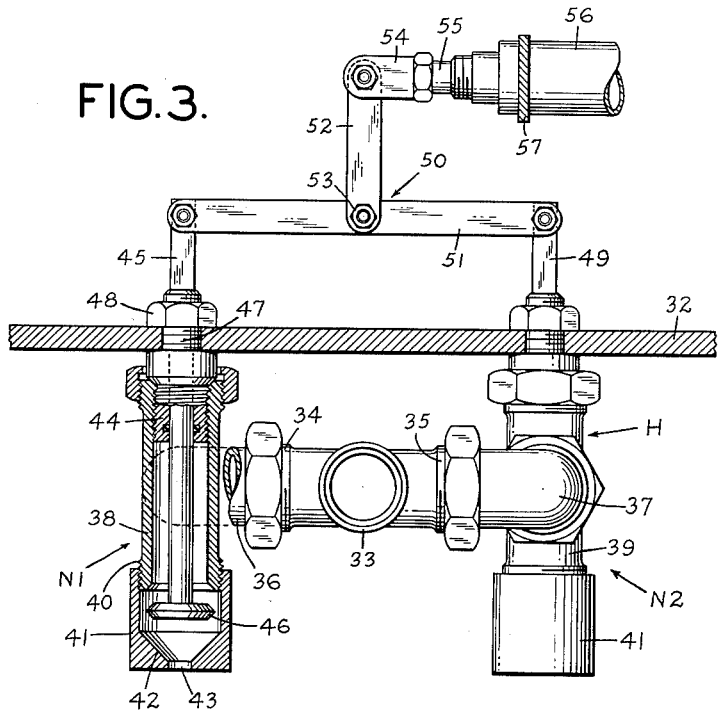
FIG. 3 is an elevational and partially sectional view of the depositing nozzles and supply manifold of the depositing apparatus.

About midway of the length of cabinet 10 is a housing 27 in which the depositing head H is mounted. As shown in FIG. 1, the housing 27 includes uprights 28, 29, 30, 31 at the four corners thereof, which are secured to and extend from the frame 15 and carry a transverse plate or platform 32 on which the depositing head H is mounted. As best shown in FIG. 3, a typical depositing head H includes a manifold pipe 33 having laterally extending couplings 34, 35 to which are connected the elbows 36, 37 which supply fluid or semi-plastic material to the casings 38, 39 of the depositing nozzles N1 and N2. Each of the casings 38, 39 is a tubular member having at its lower end a threaded portion 40 for receiving a generally cup-shaped nozzle member 41 provided with a tapered valve seat 42 and a discharge opening 43 at its lower end. Screwed into the upper end of the sleeve 38 is a closure plug 44 which receives slidably the stem 45 of a poppet-type valve 46 having a valve head of double conical shape. The plug 44 has an externally threaded tubular extension 47 thereon, which extends through the platform 32 and receives a locknut 48 to secure the nozzle N1 to the platform. Nozzle N2 is of similar construction and includes a valve stem 49 for actuating a valve plug therein similar to the valve plug 46. It will be noted that the upper ends of the valve stems 45 and 49 are connected by means of an inverted T-shaped rocker member 50 having a horizontal arm 51 and an upwardly extending arm 52, rigidly connected thereto by means of a bolt and nut 53. The upper end of upwardly extending arm 52 of the rocker member 50 is pivotally connected to a clevis 54 on the piston rod 55 of an air cylinder 56 which is fixedly mounted on a bracket 57 secured to the platform 32. Air is supplied to one end of the air cylinder by means of a pipe or hose 58, to urge the piston rod 55 outwardly and thereby move the rocker member 50 in a counterclockwise direction. Movement of the rocker member in a clockwise direction is accomplished by means of a spring, not shown, mounted in the air cylinder 56 and bearing against the piston therein or an air connection for supplying air under pressure to the end of the cylinder opposite from the end to which the pipe 58 is connected. Such cylinder and spring constructions are well known. The air cylinder and the rocker structure may be enclosed in a casing 59 to protect the elements from dirt or damage.

Liquid or semi-plastic material to be discharged through the dispensing nozzles is supplied under pressure from any suitable source. For example, the batter or topping may be supplied to the manifold 33 by means of a continuous mixer of the type disclosed in the Oakes U.S. Patent No. 2,572,049 which may be housed within the cabinet 10 mounted exteriorly thereof and connected to the manifold 33 by means of a suitable conduit. Air for actuating the air cylinder 56 is supplied from an air compressor and storage tank, not shown, housed in the cabinet 10. The air supplied to the air cylinder 56 is controlled by means of a plunger actuated air valve 60 which is operated in synchronism with the rotation of the shaft 17 by means of a cam 61 driven by the variable speed unit 19. Any other suitable type of valve may be used and an independent variable speed control may be used to control admission of air to said air cylinder and exhausting of air therefrom.

In operation, liquid or semi-plastic material is supplied under pressure to the manifold 33 and flows therefrom into the depositing nozzles N1 or N2 one of which, at any instant, has the valve therein in an open or partially open condition while the valve in the other nozzle is closed or partially closed. Thus, if the valve 46 is open as shown in FIG. 3, and the valve of nozzle N2 is closed, the liquid or semi-plastic material under pressure will flow out of the depositing nozzle N1 and will be deposited on articles moved beneath it by the conveyor 22.

As an article to receive a deposit moves beneath the nozzle N2, air will be admitted to the air cylinder 56 by means of the valve 60 and the piston rod 55 will be projected to seat the valve 46 and open the valve mounted on the valve stem 49. Inasmuch as the valve plug 46 moves in the direction of flow of the liquid, no resistance is encountered to its movement into engagement with the seat 42. During such movement, all the material between the valve and the seat is forced out through the orifice, and a seal is effected which prevents dripping or drooling of the material through the discharge opening 43. As the valve 46 closes, the valve in the dispensing nozzle N2 opens so that flow of the liquid or semi-plastic material through the manifold is not interrupted, and pulsations do not occur which might cause a variation in the amount of the material discharged.

It will be apparent that by properly timing the operation of the air cylinder, it will be possible to fill pans with batter or the like, to apply icings or decorative toppings to cakes, cookies and the like. If desired, the entire depositing head may be mounted for cyclical movement back and forth in the cabinet to enable accurate depositing of material on continuously moving relatively small articles such as cupcakes and the like.

Figure 4:
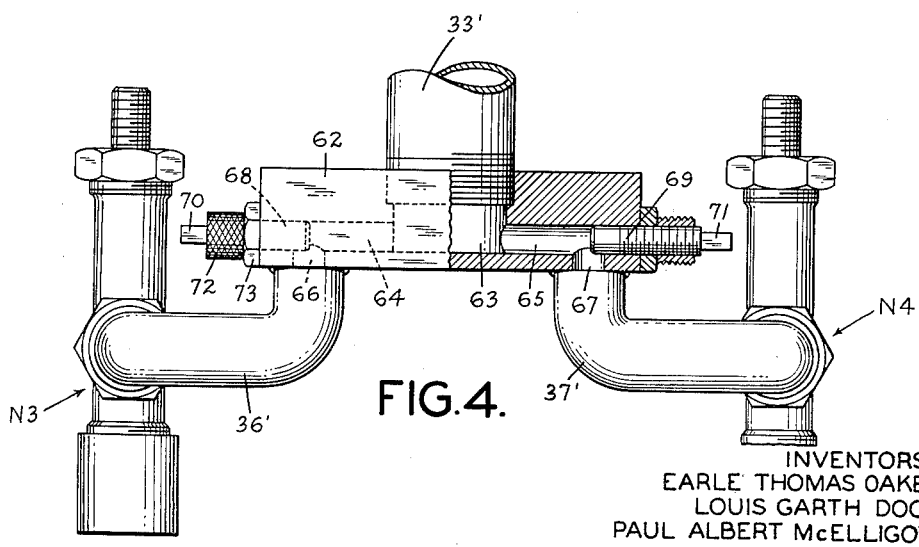
FIG. 4 is a modified form of supply manifold for the depositor including means for adjusting and equalizing the flow of the material to the depositing nozzles.

Inasmuch as some of the conduits, elbows and the like which are used in the construction of the machine may vary somewhat in internal dimensions, internal smoothness and the like, it may be desirable to provide means for equalizing the flow of the material from the manifold to the depositing nozzles. A suitable adjusting mechanism for this purpose is shown in FIG. 4. In this device, the manifold 33' is connected to a valve block 62 which has a central chamber or recess 63, connected to passages 64, 65 therein, which have downwardly opening outlets 66, 67, respectively, communicating with elbows 36', 37' corresponding to the elbows 36 and 37 shown in FIG. 3. Threaded in the ends of the passages 64 and 65 are valve plugs 68 69 which can be adjusted endwise to cover partially the outlets 66 and 67. The plugs 68 and 69 are provided with squared ends 70 and 71, respectively to permit their adjustment, and each can be locked in adjusted position by means of locknuts 72 and 73 threaded on the threaded portions thereof.

It will be apparent that by adjusting the area of the outlets 66 and 67 through which the liquid or semi-plastic material flows, the volume of liquid or semi-plastic material supplied to each of the depositing nozzles N3 and N4 can be accurately controlled and regulated.

While the apparatus disclosed above includes only two depositing nozzles, it will be understood that a plurality of rows of nozzles, each containing two or more of the nozzles, may be included in the depositor to apply toppings or icings to a plurality of rows of cupcakes, cakes or the like, or to fill pans, or accomplish other filling or depositing operations as may be required in the bakery and confectionery making industry. Accordingly, the forms of the invention described herein should be considered as illustrative and not as limiting the scope of the following claims.

We claim:

1. Depositing apparatus for semi-plastic materials used in the confectionery and baking industries comprising a manifold for receiving fluid material under pressure a pair of nozzles connected to said manifold for receiving said fluid material therefrom, each nozzle having an outlet, a valve seat in each nozzle adjacent to said outlet, a poppet valve in each nozzle movable into and out of engagement with the corresponding seat, and means for moving simultaneously the poppet valve in one of said nozzles toward said outlet in the direction of the flow of said material and into engagement with its corresponding seat and the poppet valve in the other nozzle out of engagement with its seat and away from its outlet.

2. The depositing apparatus set forth in claim 1 in which each nozzle comprises a casing, a cup-shaped member detachably mounted on one end of said casing and having said outlet and said seat on the base thereof.

3. The depositing apparatus set forth in claim 1 in which said means for moving said poppet valves comprises a rocker member having opposite ends connected to said valves, and motor for rocking said rocker member.

4. The depositing apparatus set forth in claim 1 in which each nozzle comprises a casing, a cup-shaped member detachably mounted on one end of said casing and containing said outlet and said valve seat in the base thereof and a valve stem connected to each poppet valve and extending out of the end of the casing opposite from said one end, and said means for moving said poppet valves comprises a rocker member having opposite ends connected to said valve stems and a fluid motor for rocking said rocker member.

5. Depositing apparatus for semi-plastic materials used in the confectionery and backing industries comprising means for advancing a plurality of rows of articles along a path, at least one pair of depositing nozzles spaced above said path, each nozzle having a casing with an outlet in its lower end and a valve seat therein adjacent to said outlet, a poppet valve mounted in said casing for movement away from said seat and outlet to an open position and to a closed position in engagement with said seat, means for alternately moving said valves into open and closed positions and means for supplying material to be deposited to said nozzles at a substantially constant pressure for flow through said nozzles in the direction of movement of said valve to a closed position.

6. The depositing apparatus set forth in claim 1 in which said valve seat is substantially conical and converges toward said outlet, and said poppet valve is a double conical valve.

7. The depositing apparatus set forth in claim 5 in which said means for supplying material to said nozzles comprises passages connected to said nozzles and means for varying the cross-sectional areas of a portion of at least one of said passages to equalize the flow of said material to said nozzles.

8. The apparatus set forth in claim 5 in which said means for supplying material to said nozzles comprises passages connected to said nozzles, and a plug member adjustable in at least one of said passages to vary its cross-sectional area to equalize the flow of said material to said nozzles.

References Cited in the file of this patent

UNITED STATES PATENTS

| | | |
|---|---|---|
| 1,334,223 | Byrd | Mar. 16, 1920 |
| 1,485,426 | Norris | Mar. 4, 1924 |
| 1,748,985 | Hunicke | Mar. 4, 1930 |
| 1,795,307 | Johnston | Mar. 10, 1931 |

FOREIGN PATENTS

| | | |
|---|---|---|
| 388 | Great Britain | Jan. 30, 1877 |
| 16,083 | Sweden | July 18, 1903 |
| 1,014,009 | France | May 14, 1952 |